US010133312B2

(12) United States Patent
Andre et al.

(10) Patent No.: US 10,133,312 B2
(45) Date of Patent: Nov. 20, 2018

(54) ENCLOSURE FEATURES FOR A PORTABLE COMPUTING DEVICE

(71) Applicant: Apple Inc., Cupertino, CA (US)

(72) Inventors: Bartley K. Andre, Menlo Park, CA (US); Brandon S. Smith, Mountain View, CA (US); Charles A. Schwalbach, Menlo Park, CA (US); Gavin J. Reid, Campbell, CA (US); Houtan R. Farahani, San Ramon, CA (US); Zheng Gao, San Jose, CA (US); Michael D. McBroom, Leonard, TX (US); Hilbert T. Kwan, Cupertino, CA (US); Joss N. Giddings, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 771 days.

(21) Appl. No.: 13/869,605

(22) Filed: Apr. 24, 2013

(65) Prior Publication Data

US 2014/0111929 A1    Apr. 24, 2014

Related U.S. Application Data

(60) Provisional application No. 61/715,798, filed on Oct. 18, 2012.

(51) Int. Cl.
*G06F 1/16* (2006.01)

(52) U.S. Cl.
CPC .................................. *G06F 1/1656* (2013.01)

(58) Field of Classification Search
CPC .. H05K 5/0013; H05K 5/0052; H05K 5/0056; H05K 5/0221; H05K 7/1092; H05K 9/0016; H05K 9/0032; G06F 1/1637; G06F 1/1656; G06F 1/1616
USPC ..... 292/1, 17, 80, 81, 87, 303, DIG. 69, 340
See application file for complete search history.

(56) References Cited

U.S. PATENT DOCUMENTS

| | | | | |
|---|---|---|---|---|
| 3,261,628 A | * | 7/1966 | Kesling | E05C 19/063 292/17 |
| 3,520,568 A | * | 7/1970 | White | D06F 37/28 292/255 |
| 4,242,111 A | * | 12/1980 | Arends | B01D 53/265 55/315.2 |
| 4,331,168 A | * | 5/1982 | Hatakeyama | A45C 13/1084 132/316 |
| 5,005,880 A | * | 4/1991 | Raine | E05C 19/066 292/17 |
| 5,243,771 A | * | 9/1993 | Kretchman | D06F 58/04 126/190 |
| 5,422,784 A | * | 6/1995 | Wakahara | G06F 1/1616 361/679.02 |

(Continued)

*Primary Examiner* — Hoa C Nguyen
*Assistant Examiner* — Christopher L Augustin
(74) *Attorney, Agent, or Firm* — Dickinson Wright RLLP

(57) ABSTRACT

The present application describes various embodiments regarding systems and methods for providing a lightweight and durable portable computing device having a thin profile. The portable computing device can take the form of a laptop computer. The portable computing device can include a case snap system configured to movably attach two portions of a base of the computing device together. The portable computing device can include a lid portion with a support structure having a shaped profile configured to support a display. The portable computing device can include locating features disposed within the base portion configured to locate internal components.

20 Claims, 12 Drawing Sheets

(56) References Cited

U.S. PATENT DOCUMENTS

| | | | | |
|---|---|---|---|---|
| 6,355,878 | B1* | 3/2002 | Kim | H05K 9/0015 |
| | | | | 174/354 |
| 6,744,622 | B2 | 6/2004 | Lee et al. | |
| 6,954,992 | B2* | 10/2005 | Hwang | D06F 58/04 |
| | | | | 34/108 |
| 7,609,501 | B2* | 10/2009 | Anthony | H01L 23/49822 |
| | | | | 361/118 |
| 8,014,155 | B2 | 9/2011 | Kanayama et al. | |
| 8,066,308 | B2* | 11/2011 | Lee | E05C 19/06 |
| | | | | 292/44 |
| 8,118,332 | B2* | 2/2012 | Morgan | E05C 19/063 |
| | | | | 292/17 |
| 8,559,623 | B2* | 10/2013 | Chen | H04M 1/0237 |
| | | | | 16/327 |
| 9,250,654 | B2* | 2/2016 | Brogan | G06F 1/1601 |
| 2001/0036057 | A1* | 11/2001 | Fukuyoshi | G02F 1/133308 |
| | | | | 361/679.26 |
| 2002/0075647 | A1* | 6/2002 | DiFonzo | G06F 1/1616 |
| | | | | 361/679.48 |
| 2003/0128530 | A1* | 7/2003 | Mattei | H05K 7/06 |
| | | | | 361/752 |
| 2005/0018393 | A1 | 1/2005 | Kuo et al. | |
| 2008/0161075 | A1* | 7/2008 | Kim | H04M 1/0237 |
| | | | | 455/575.4 |
| 2008/0251893 | A1* | 10/2008 | English | H05K 9/0032 |
| | | | | 257/659 |
| 2008/0304217 | A1* | 12/2008 | Lai | G06F 1/1616 |
| | | | | 361/679.26 |
| 2011/0155448 | A1* | 6/2011 | Saito | G06F 1/1616 |
| | | | | 174/520 |
| 2011/0176261 | A1* | 7/2011 | Wu | H04M 1/0237 |
| | | | | 361/679.01 |
| 2011/0239418 | A1* | 10/2011 | Huang | F16B 5/065 |
| | | | | 24/592.11 |
| 2013/0075550 | A1* | 3/2013 | Chiu | H05K 5/0234 |
| | | | | 248/188.9 |

\* cited by examiner

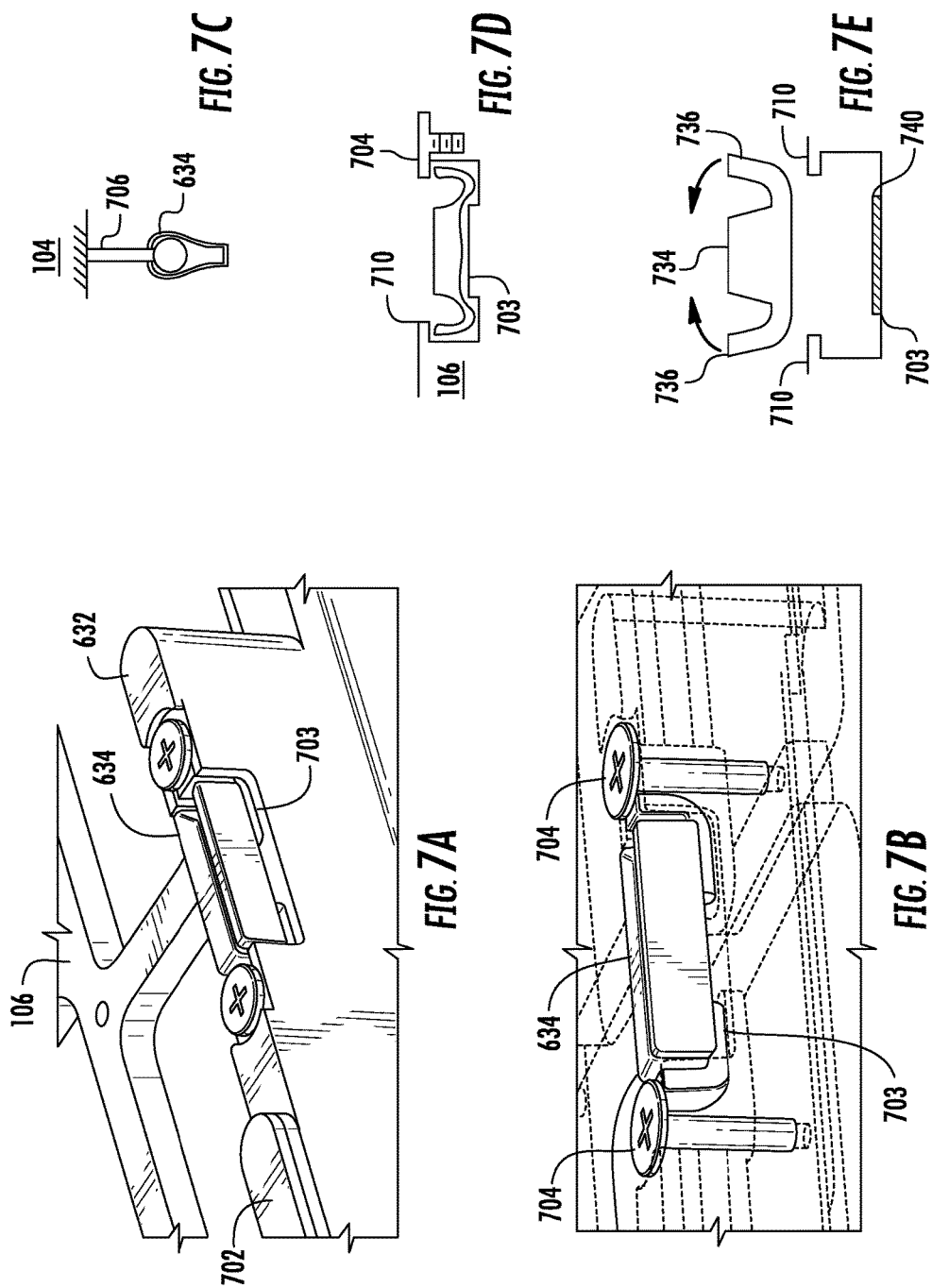

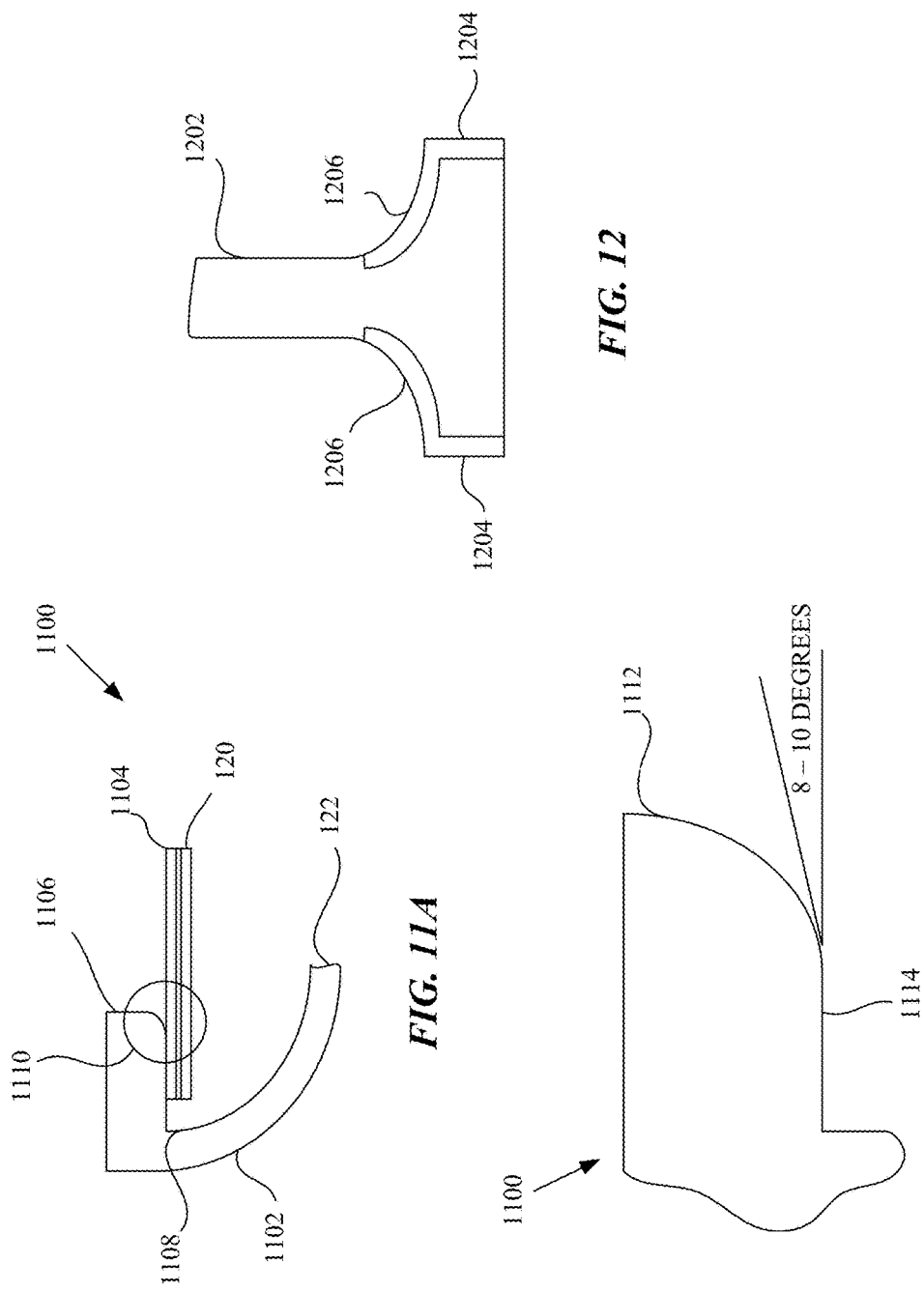

ENCLOSURE FEATURES FOR A PORTABLE COMPUTING DEVICE

CROSS REFERENCE TO RELATED APPLICATIONS

This U.S. Patent Application claims priority under 35 USC 119(e) to US Provisional Patent Application No. 61/715,798 filed Oct. 18, 2012 entitled "Enclosure Features for a Portable Computing Device" by Andre et al. which is incorporated by reference in its entirety for all purposes.

TECHNICAL FIELD

The embodiments described herein relate generally to portable computing devices. More particularly, the present embodiments relate to structures and fabrication of enclosures suitable for portable computing devices.

BACKGROUND

The outward appearance of a portable computing device, including its design and its heft, is important to a user of the portable computing device, as the outward appearance contributes to the overall impression that the user has of the portable computing device. At the same time, the assembly of the portable computing device is also important to the user, as a durable assembly will help extend the overall life of the portable computing device and will increase its value to the user.

One design challenge associated with the manufacture of portable computing devices is the design of the outer enclosures used to house the various internal components. This design challenge generally arises from a number conflicting design goals that include the desirability of making the outer enclosure or housing lighter and thinner, of making the enclosure stronger, and of making the enclosure aesthetically pleasing, among other possible goals. Lighter housings or enclosures tend to be more flexible and therefore have a greater propensity to buckle and bow, while stronger and more rigid enclosures tend to be thicker and carry more weight. Additionally, the integration of the various internal components into the outer enclosure can be a challenge since thinner, smaller housings can provide reduced volumes for the placement of internal components in a straightforward manner. Also, thinner enclosures can be prone to bowing that may damage internal parts or lead to other failures. Furthermore, the overall appearance of the portable computing device must be aesthetically pleasing, as few consumers desire to own or use a device that is perceived to be ugly or unsightly. Due to such considerations, portable computing device enclosure materials are typically selected to provide sufficient structural rigidity while also meeting weight constraints, with any aesthetic appeal being worked into materials that meet these criteria.

Therefore, it would be beneficial to provide a portable computing device that is aesthetically pleasing and lightweight as well as capable of supporting internal components associated with features related to the portable computing device.

SUMMARY

The present application describes various embodiments regarding systems and methods for providing a lightweight and durable portable computing device having a thin profile. This can be accomplished at least in part through the use of a multi-part housing described herein.

In one embodiment, a portable computing device is described. The portable computing device includes a bottom case that further includes a snap plug and a top case that includes an integrated support beam configured to support a case snap, that can translate a predetermined amount within the plane of the top case and another predetermined amount perpendicular to the top case, where the case snap is configured to receive the snap plug and couple the bottom case to the top case.

In another embodiment, the portable computing device can include a top case and a bottom case forming a base portion and a lid portion, pivotally coupled to the base portion and configured to enclose and support a display, the lid portion including a support structure for the display where the support structure includes a deep undercut region and a ridge region with a blended edge.

In yet another embodiment, the portable computing device can include a bottom case, and a top case configured to couple to the bottom case and form a base portion of the portable computing device, the top case further including a connector port formed through a side wall of the top case and a datum formed on the interior of the top case, proximate to the connector port where a surface of the datum is configured to accurately position a connector with respect to the connector port.

In still another embodiment, a portable computing device can include a bottom case, where the bottom case includes at least one mounting hole configured to receive a mounting screw and a top case configured to receive the bottom case and form a lower portion of the portable computing device, the top case including at least one boss configured to receive the mounting screw inserted through the at least one mounting hole in the bottom case where the boss includes one or more fiducial marks formed through a common machining operation used to form at least one feature of the boss.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements.

FIGS. 7A-7E shows a snap support system in accordance with the described embodiments.

FIGS. 11A and 11B show structural features within a rear cover configured to support display.

FIG. 12 shows one embodiment of a profile tool for forming structural features of the rear cover.

DETAILED DESCRIPTION

Figure 1:
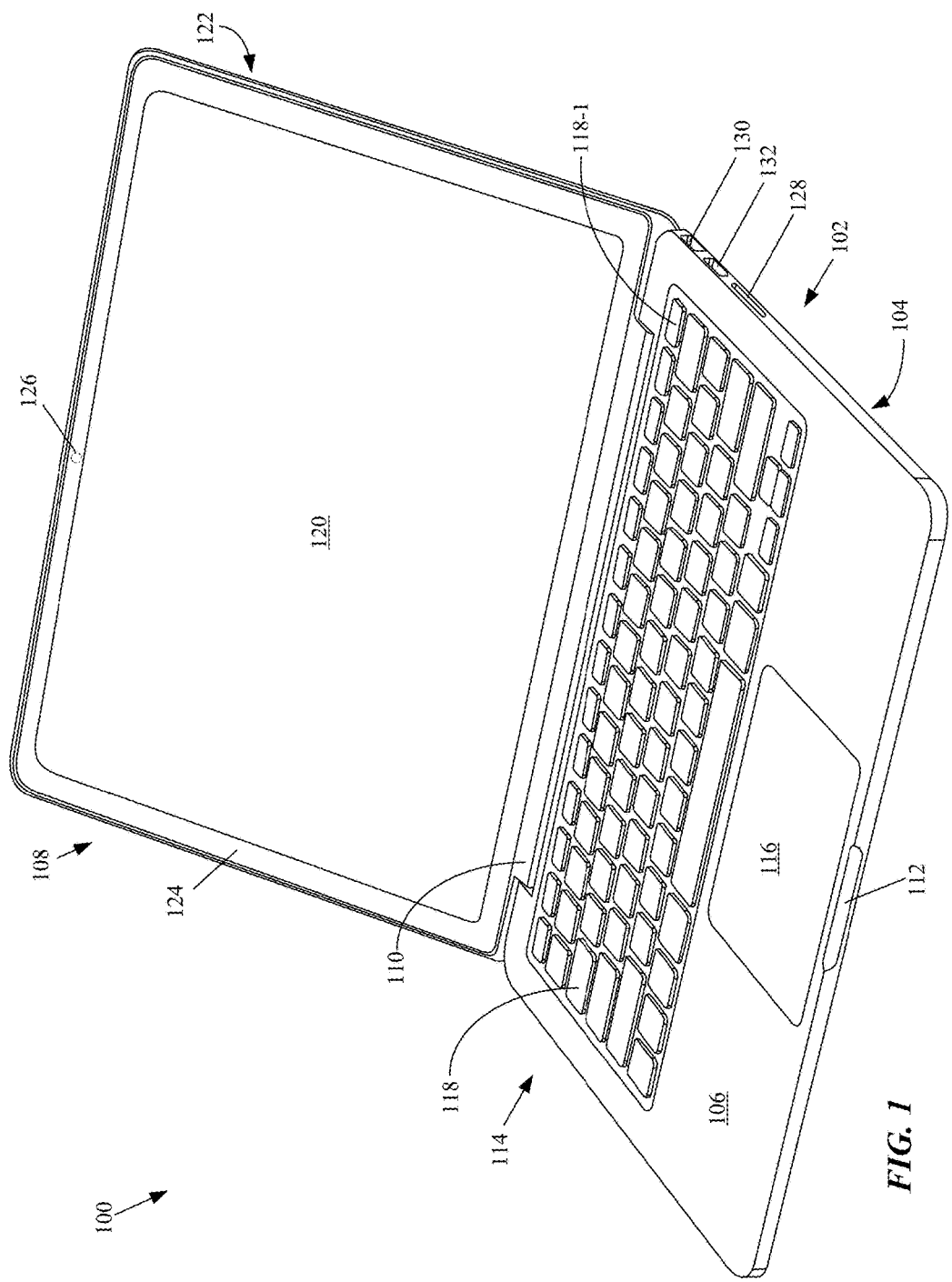
FIG. 1 shows a front facing perspective view of an embodiment of the portable computing device in the form of portable computing device in an open (lid) state.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The top case and the bottom case can each be joined in a particular manner at an interface region such that the gap and offset between top and bottom cases are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The multipart housing can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. The superior conductivity of aluminum provides a good chassis ground for internal electrical components arranged to fit and operate within the housing. The aluminum housing also provides a good electromagnetic interference (EMI) shield protecting sensitive electronic components from external electromagnetic radiation as well as reducing electromagnetic radiation emanating from the portable computing device.

The top case can include a cavity, or lumen, into which a plurality of operational components can be inserted during an assembly operation. In the described embodiment, the operational components can inserted into the lumen and attached to the top case in an "top-bottom" assembly operation in which top most components are inserted first followed by components in a top down arrangement. For example, the top case can be provided and shaped to accommodate a keyboard module. The keyboard module can include a keyboard assembly formed of a plurality of keycap assemblies and associated circuitry, such as a flexible membrane on which can be incorporated a switching matrix and protective feature plate. Therefore, following the top-bottom assembly approach, the keyboard assembly is first inserted into the top case followed by the flexible membrane and then the feature plate that is attached to the top case. Other internal components can then be inserted in a top to bottom (when viewed from the perspective of the finished product) manner.

In one embodiment, the keyboard module can be configured in such a way that a keycap assembly can be used to replace a power switch. For example, in a conventional keyboard each of a top row of keycaps can be assigned at least one function. However, by re-deploying one of the keycaps as a power button, the number of operational components can be reduced by at least eliminating the switch mechanism associated with the conventional power button and replacing it with the already available keycap assembly and associated circuitry.

In addition to the keyboard, the portable computing device can include a touch sensitive device along the lines of a touch pad, touch screen, etc. In those embodiments where the portable computing device includes a touch pad the touch pad can be formed from a glass material. The glass material provides a cosmetic surface and is the primary source of structural rigidity for the touchpad. The use of the glass material in this way significantly reduces the overall thickness of the touchpad compared to previous designs.

Due at least to the strong and resilient nature of the material used to form the multipart housing; the multipart housing can include a number of openings having wide spans that do not require additional support structures. Such openings can take the form of ports that can be used to provide access to internal circuits. The ports can include, for example, data ports suitable for accommodating data cables configured for connecting external circuits. The openings can also provide access to an audio circuit, video display circuit, power input, etc.

In one embodiment, the top case can be formed from a single billet of aluminum that is machined into a desired shape and size. The top case can include an integrated support system that adds to the structural integrity of the top case. The integrated support system can be continuous in nature in that there are no gaps or breaks. The integrated support system can be used to provide support for individual components (such as a keyboard). For example, the integrated support system can take the form of ribs that can be used as a reference datum for a keyboard. The ribs can also provide additional structural support due to the added thickness of the ribs. The ribs can also be used as part of a shield that help to prevent light leaking from the keyboard as well as act as a Faraday cage that prevents leakage of extraneous electromagnetic radiation.

The integrated support system can also provide mounting structures for those internal components mounted to the multi-part housing. Such internal components include a mass storage device (that can take the form of a hard disk drive, HDD, or solid state drive, SSD), audio components (audio jack, microphone, speakers, etc.) as well as input/output devices such as a keyboard and touch pad.

These and other embodiments are discussed below with reference to FIGS. 1-13. However, those skilled in the art will readily appreciate that the detailed description given herein with respect to these figures is for explanatory purposes as the invention extends beyond these limited embodiments.

FIGS. 1-13 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In the described embodiment, a microphone can be located at a side portion of top case 106 that can be spaced apart to improve frequency response of an associated audio circuit.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have unibody construction that can provide additional strength and resiliency to lid portion 108, which can be particularly important due to the stresses caused by repeated opening and closing. In addition to the increase in strength and resiliency, the unibody construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can be used to accommodate data connections such as USB, FireWire, Thunderbolt, and so on.

Figure 2:
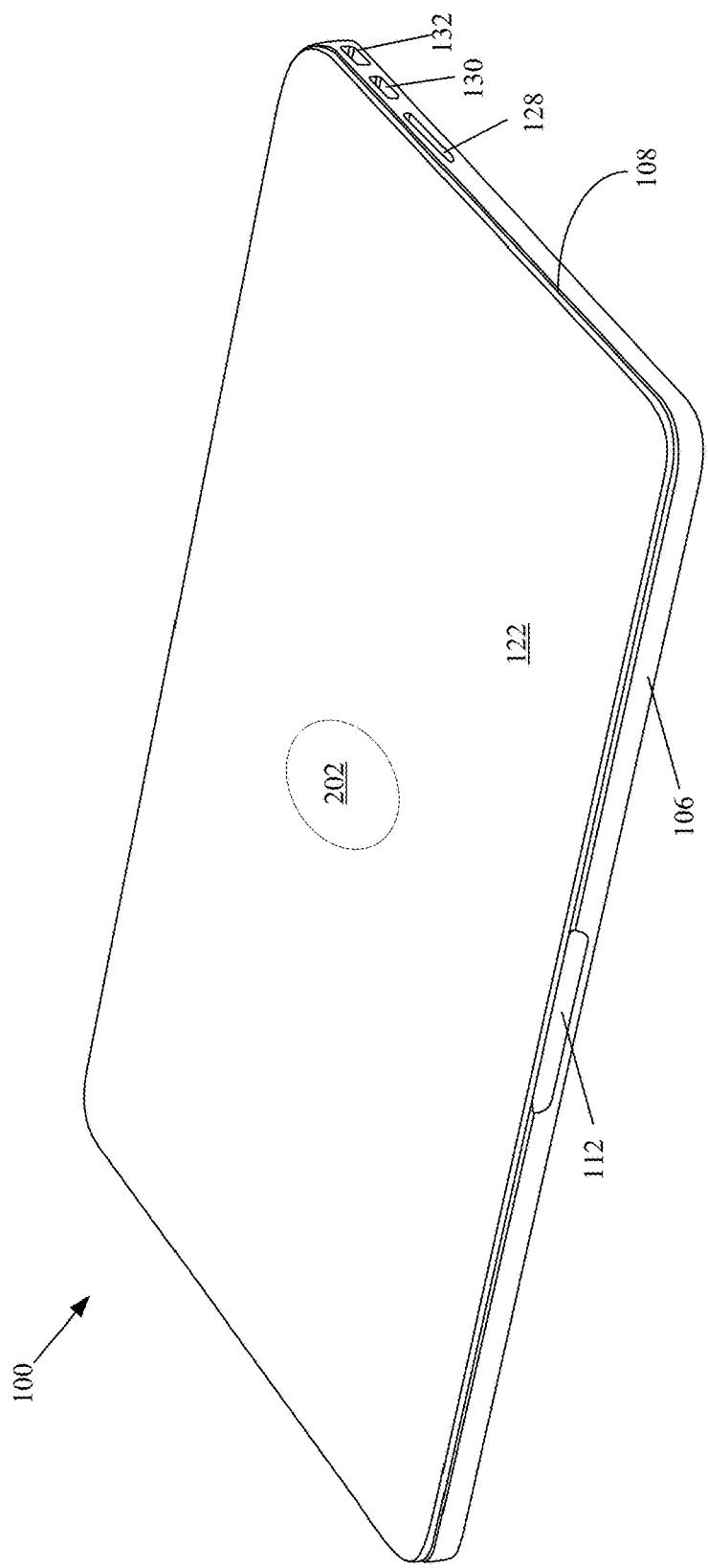
FIG. 2 shows portable computing device in a closed (lid) configuration that shows rear cover and logo.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
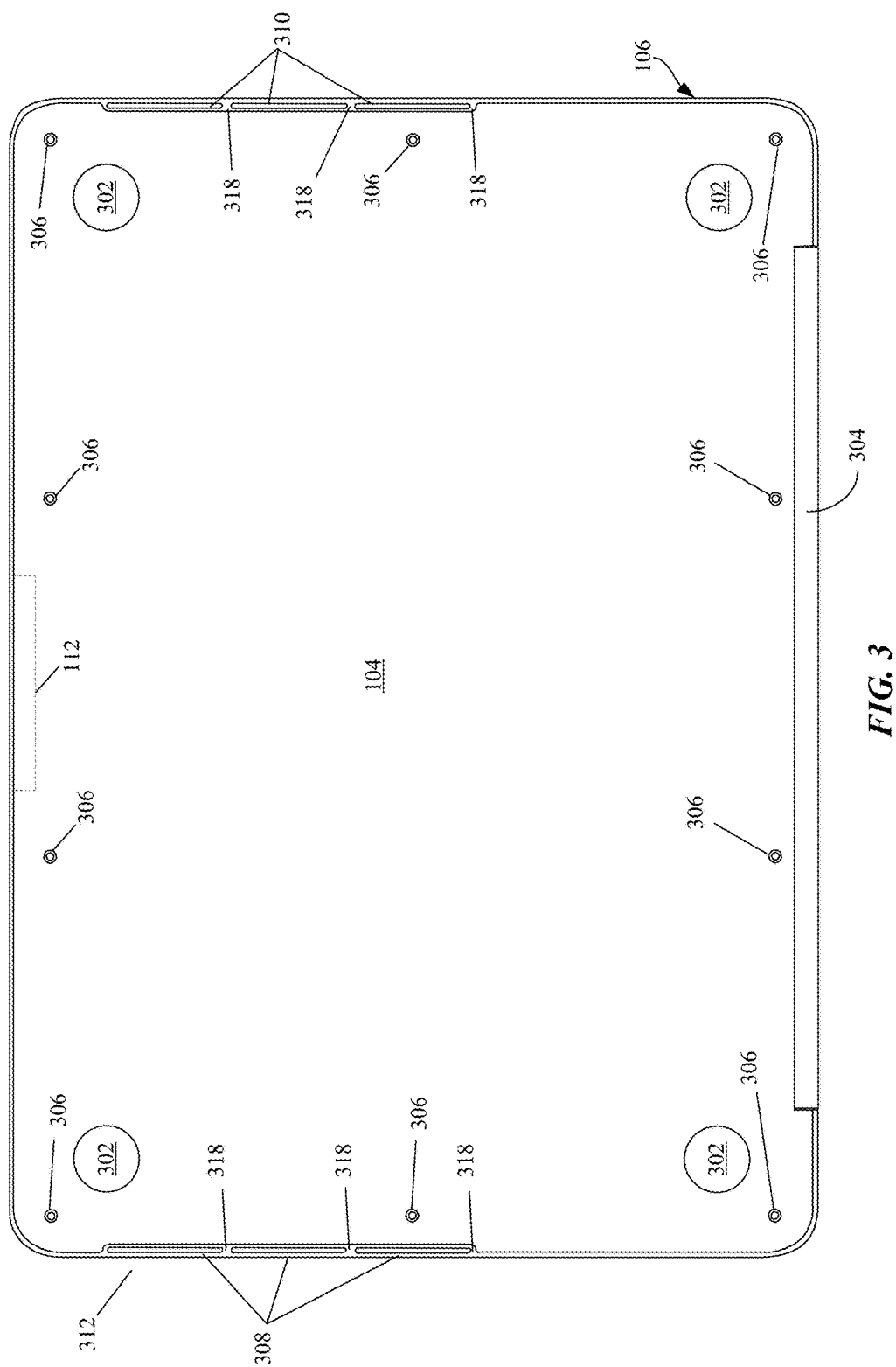
FIG. 3 shows an external view of a bottom case.

FIG. 3 shows an external view of bottom case 104 showing relative positioning of support feet 302, insert 112, cosmetic wall 304 that can be used to conceal clutch assembly 110 and fasteners 306 used to secure bottom case 104 and top case 106 together. Support feet 302 can be formed of wear resistant and resilient material such as plastic. Also in view are multi-purpose front side sequentially placed vents 308 and 310 that can be used to provide a flow of outside air that can be used to cool internal components. In the described embodiment, vents 308 and 310 can be placed on an underside of top case 106 in order to hide the vents from view as well as obscure the view of an interior of portable computing device 100 from the outside. Vents 308 and 310 can act as a secondary air intake subordinate to primary air intake vents located at a rear portion of portable computing device 100 (described below). In this way, vents 308 and 310 can help to maintain an adequate supply of cool air in those situations where portions of the rear vents are blocked or otherwise have their air intake restricted.

Vents 308 and 310 can also be used to output audio signals in the form of sound generated by an audio module (not shown). Vents 308 and 310 can be part of an integrated support system in that vents 308 and 310 can be machined from the outside and cut from the inside during fabrication of top case 106. As part of the machining of vents 308 and 310, stiffener ribs can be placed within vent openings 308 and 310 to provide additional structural support for portable computing device 100.

Moreover, trusses 318 can be formed between vents 308 and 310 in combination with ribs 316 can add both structural support as well as assist in defining both the cadence and size of vents 308 and 310. The cadence and size of vents 308 and 310 can be used to control air flow into portable computing device 100 as well as emission of RF energy in the form of EMI from portable computing device 100. Accordingly, stiffener ribs can separate an area within vents 308 and 310 to produce an aperture sized to prevent passage of RF energy. As well known in the art, the size of an aperture can restrict the emission of RF energy having a wavelength that can be "trapped" by the aperture. In this case, the size of vents 308 and 310 is such that a substantial portion of RF energy emitted by internal components can be trapped within portable computing device 100. Furthermore, by placing vents 308 and 310 at a downward facing surface of top case 106, the aesthetics of portable computing device 100 can be enhanced since views of internal components from an external observer are eliminated.

Figure 4:
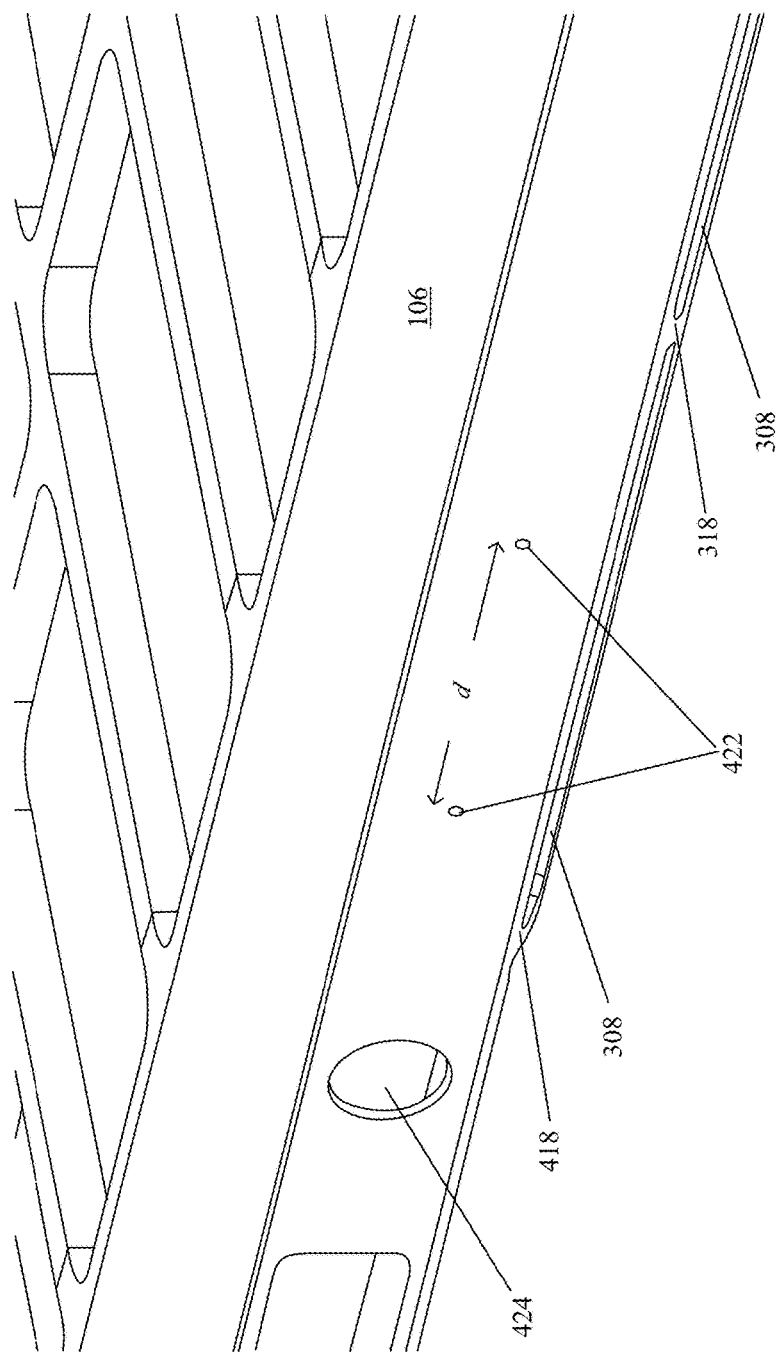
FIG. 4 shows an embodiment of top case having openings suitable for receiving audio signals and audio jack opening an example of side openings in accordance with the described embodiments.

FIG. 4 shows an embodiment of top case 106 having openings suitable for receiving audio signals and audio jack opening 424. In this embodiment, microphone openings 422 are spaced apart distance "d" in order to facilitate error correction in speech recognition algorithms. Distance d can vary depending upon a desired frequency response. For example, distance d can be on the order of about 15 mm. Although not readily apparent from FIG. 4, microphone openings 422 can be part of an internal microphone system. In one case, microphone openings 422 can lead to audio ports that lead to an audio circuit having a transducer for converting audio signals (in the form of a voice, for example) into digital data for subsequent processing. The audio ports can be formed as part of top case 106. In order to conserve the amount of space required for the audio ports, the audio ports can connected to an audio circuit disposed within portable computing device 100 by way of audio channels. The audio channels can be "slanted" at angle θ that provides an appropriate channel length for tuning. For example, angle θ can be about 22°.

Figure 5:
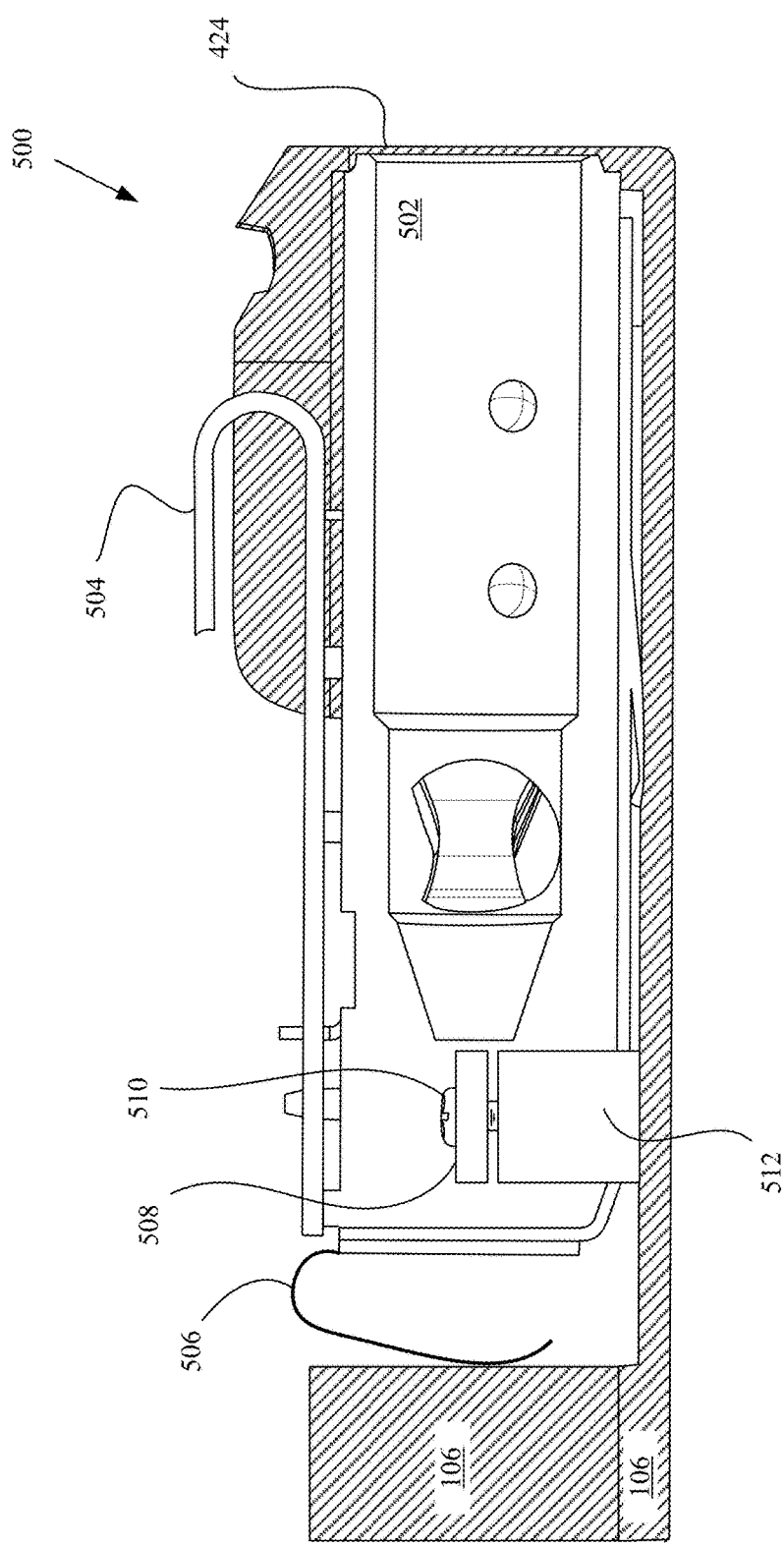
FIG. 5 shows one embodiment of an audio jack assembly mounted in top case.

FIG. 5 shows one embodiment 500 of an audio jack assembly 502 mounted in top case 106. Audio jack assembly 502 can include an audio cable 504 configured to couple to internal contacts within audio jack assembly 502 and allow other components such as audio processing circuits (not shown) to receive audio signals from audio jack assembly 502. A spring 506 included with assembly 502 can bias the audio jack toward audio jack opening 424. In one embodiment, exterior elements of audio jack assembly 502 can cooperate with audio jack opening 424 to allow spring 506 to center and position assembly 502 with respect to audio jack opening 424.

Audio jack assembly 502 can include one or more mounting flanges 508. In one embodiment, audio jack assembly 502 can include two mounting flanges 508 disposed on opposite sides of the audio jack body. Top case 106 can include mounting bosses 512 that, in cooperation with mounting flanges 508, can affix audio jack assembly 502 into position with respect to top case 106. In one embodiment, screw 510 can protrude through an opening in mounting flange 508 and be received into a tapped hole in mounting boss 512.

Figure 6:
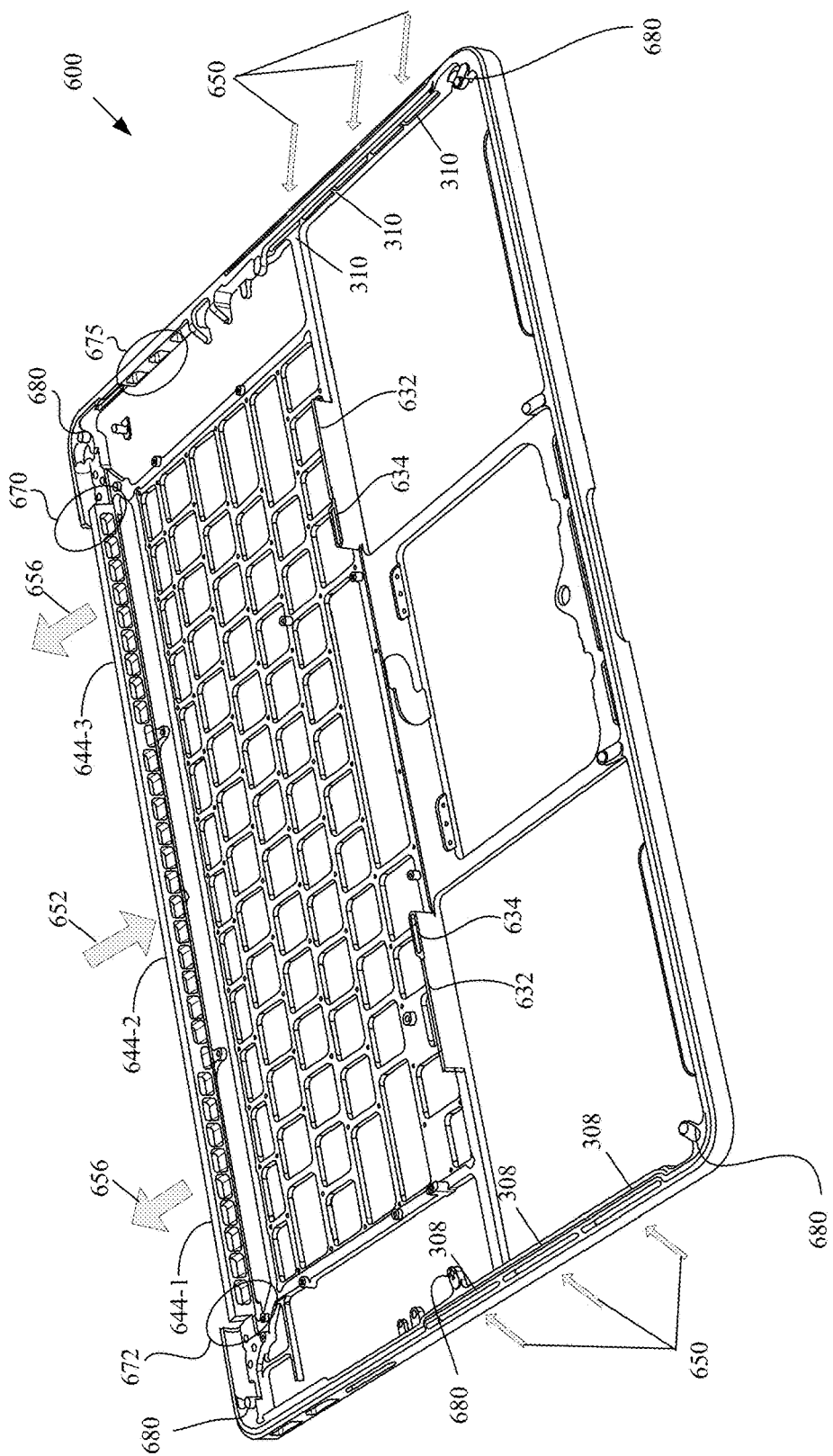
FIG. 6 shows a perspective view of top case highlighting particular internal features

FIG. 6 shows a perspective view 600 of top case 106 highlighting particular internal features of top case 106. Rear vent 644-2 and vents 308, 310 can provide cooling air intake flow 650, 652. Air can be exhausted through rear vents 644-1 and 644-3. In one embodiment, secondary air intake flow 650 can support primary air intake flow 652 at rear vent 644-2. In this way, if primary air intake flow 652 is reduced (by obstruction of rear vent 644-2, for example), secondary air intake flow 650 can at least partially compensate for the reduction in primary air intake flow 652 to maintain adequate air exhaust airflow 656 for cooling of internal components.

Top case 106 can include an integrated support beam configured as snap supports 632 that in turn support case snaps 634 that can be used to help hold bottom case 104 in position with respect to top case 106. The snap support system is described in greater detail in conjunction with FIG. 7 below. Top case 106 can include bosses 680 that can be configured to receive fasteners 306 to affix bottom case 104 to top case 106. Cooling fans (not shown) can be mounted within top case 106 to provide airflow 650, 652 and 656. Locating features can be disposed within top case 106 in areas 670 and 672 that can be configured to help locate cooling fans with respect to top case 106. These location features are described in greater detail in conjunction with FIG. 8. Input output ports openings within region 675 can allow connectors to access and couple with connectors within top case 106. Features can be formed on and within top case 106 to help align connectors with top case 106. These features are described in more detail in conjunction with FIG. 9.

FIGS. 7A-7E shows a snap support system in accordance with the described embodiments. The snap support system can be used to locate and establish a positional relationship between top case 106 and bottom case 104. FIG. 7A shows an isometric view of one embodiment of a case snap 634 disposed in top case 106. Snap support 632 can be formed as an integral portion of top case 106. Snap support 632 can include a foam strip 702 that can be configured to dampen or prevent noise that can result from interaction between bottom case 104 and top case 106. Case snaps 634 can be disposed into pocket 703 that can be configured to house case snap 634. Pocket 703 and case snap 634 can provide a predetermined amount of freedom of motion between top case 106 and bottom case 104. For example, the pocket 703 can be configured to allow translation of case snap 634 within the plane of top case 106 (i.e., provide relative motion in an x-y axis) as well as motion perpendicular to the plane of top case 106 (i.e., z axis motion). Case snap 634 can act as a receptacle for snap plug 706 that can be mounted to or formed within bottom case 104.

FIG. 7B shows case snap 634 within pocket 703. In one embodiment, case snap 634 can be placed into pocket 703 and can be retained with screws 704. As shown, the shoulders of screws 704 can constrain case snap 634 within pocket 703. FIG. 7C shows a cross sectional view of case snap 634 and snap plug 706. Snap plug 706 can be affixed to bottom case 104 in a location such that the snap plug 706 aligns with case snap 634 when bottom case 104 is placed on top case 106. The cross section shows one example of how snap plug 706 can engage with case snap 634. FIG. 7D shows another embodiment of case snap 634 and pocket 703 formed in top case 106. In this embodiment, top case 106 can include an overhang feature 710 that can replace one of the two screws 704 (as shown in FIG. 7A) that can be used to retain case snap 634 in top case 106. This embodiment can advantageously reduce a parts count and can simplify assembly. FIG. 7E shows yet another embodiment of case snap 734 in top case 106. Case snap 734 can be formed to include integral compliant spring arms 736. Top case 106 can include a pocket 738 with two overhang areas 710. Case snap 734 can be pressed into pocket 738 such that portions of the top case 106 can force spring arms 736 to displace and allow case snap 734 to be inserted into pocket 738. FIG. 7E also shows foam 740 placed in the bottom of pocket 703. Foam 740 can help bias case snap 634 or case snap 734 upward and can provide more motion of the case snap 634, 734. Foam 740 can be used in conjunction with any embodiment of case snap (634, 734) described herein.

By attaching top case 106 to bottom case 104 with the case snap and snap plug, the insertion of and securing of fasteners 306 into bosses 680 can be made more efficient. For example, during an assembly operation, top case 106 and bottom case 104 can be attached to each other through the case snap 634 and snap plug 706. The case snap 634 can provide sufficient "play" in a planar direction is for securing fasteners 302 into bosses 680. The increase in play can make it easier to insert fasteners 302 into bosses 680 which can make the overall assembly process easier and more efficient. In addition to making assembly easier and more efficient, securing top case 106 and bottom case 104, an amount of flexion of a central region of bottom case 104 can be greatly reduced thereby preventing "belly rub" (where an exterior surface of bottom case 104 flexes to the point where it comes in contact with a surface upon which it rests).

Figure 8A:
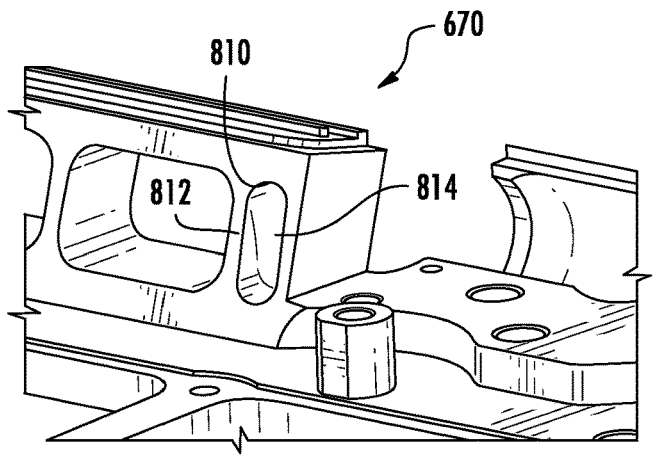
FIG. 8A-8C shows views of a locating feature in accordance with the described embodiments.
Figure 8B:
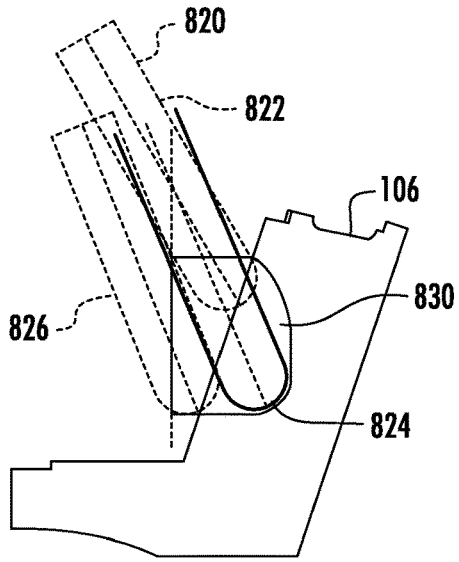
Figure 8C:
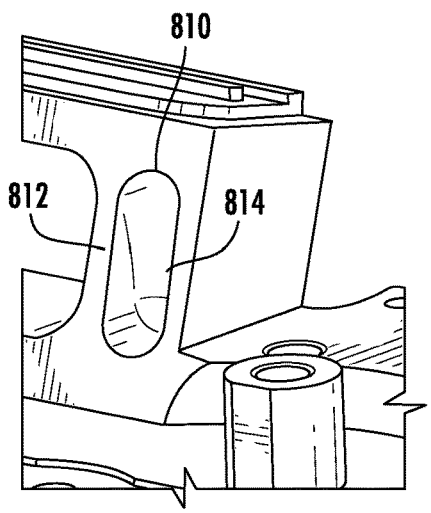

FIGS. 8A-8C shows views of a locating feature in accordance with the described embodiments. FIG. 8A shows area 670 of top case 106. Area 672 can be formed similar to area 670. Locating feature 810 can be formed in top case 106 and can be configured to provide one or more vertical datums (812, 814) for internal components. In one embodiment, the internal component can be a fan. In another embodiment, the locating feature 810 can include physical geometries that can be similar to rear vents 644-1, 644-2 and 644-3. As such, locating feature 810 can not only perform as a datum but can also offer a pleasing visual appearance.

FIG. 8B shows possible manufacturing steps for forming locating feature 810 in top case 106. In one embodiment, locating feature 810 can be formed in top case 106 with a ball-end cutter 820. Ball end cutter 820 can begin at a first position 822. The ball end cutter 820 can plunge into top case 106 and can rotate as the cutter approaches second position 824. This rotation can form curved back wall 830. Finally, ball end cutter 820 can be withdrawn from top case 106 to third position 826. FIG. 8C shows an isometric view of the locating feature 810. Vertical datums 812 and 814 are shown. The positional control of vertical datums 812 and 814 can be well controlled particularly when the locating feature 810 is formed with a computer numerical controlled machine tool.

Figure 9A:
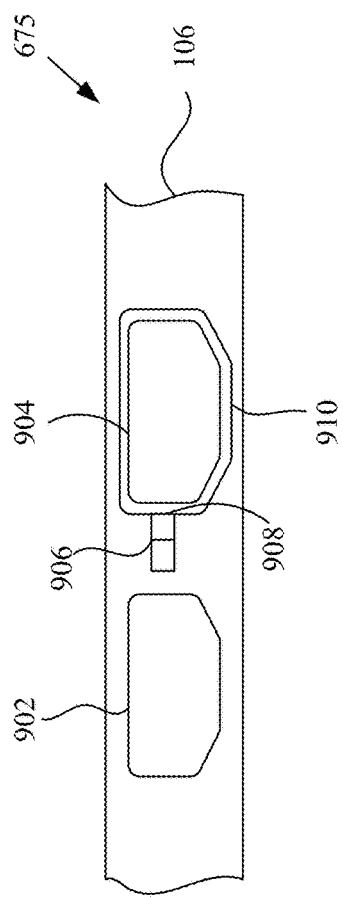
FIGS. 9A and 9B show alignment features in the top case in accordance with the described embodiments.
Figure 9B:
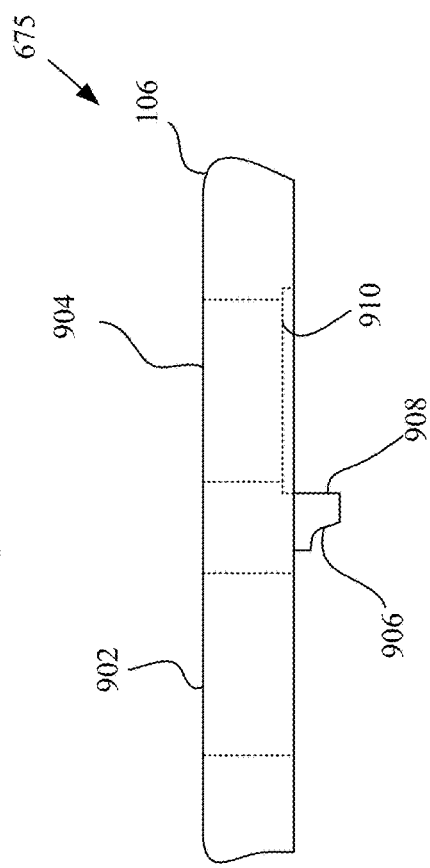

FIGS. 9A and 9B show alignment features in the top case in accordance with the described embodiments. Alignment features can enable connectors such as input/output (I/O) connectors to be more accurately be positioned with respect to openings in top case 106. FIG. 9A shows a detailed view of region 675 that can include first port 902 and second port 904. This view is looking out from within top case 106. These input output ports can support USB, HDMI, memory cards, high speed data links, or any technology that can benefit from the use of a connector. Datum 906 can protrude slightly into an interior volume of top case 106. In one embodiment, at least one surface 908 of datum 906 can be machined in the same machining operation that forms at least one feature of a port opening. By combining machining operations, the positional relationship of the port opening 904 and the surface 908 of the datum 906 can be controlled. By controlling this positional relationship, a connector can be repeatedly and reliably positioned so that access to the connector with cables or the like through ports is well conditioned. In one embodiment, the at least one feature of the port can be a relief cut 910 made circumferentially around the port. FIG. 9B is a cross-sectional view of region 675. As shown, port 902 and 904 can be openings through top case 106. Datum 906 can protrude toward the interior of top case 106. A common machining operation can machine surface 908 and a relief cut 910 on port 904.

Figure 10:
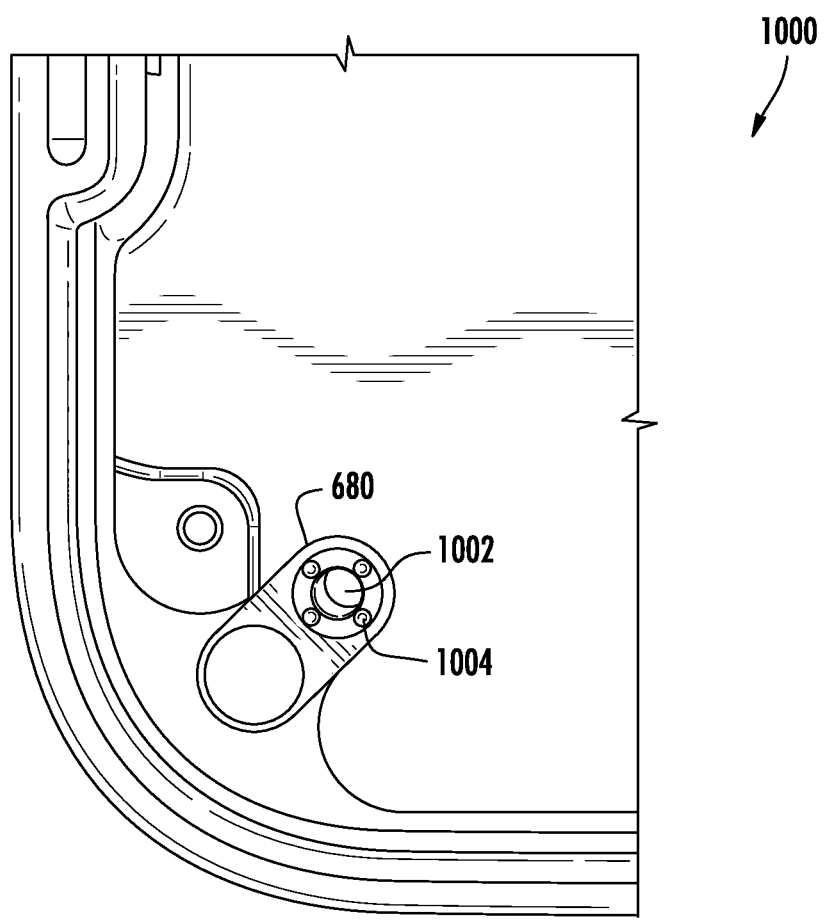
FIG. 10 shows a boss with fiducial marks.

FIG. 10 shows a view 1000 boss 680 with fiducial marks. In one embodiment, the through hole 1002 of boss 680 can be made at substantially the same time as fiducial marks 1004. For example, a common machining operation can form fiducial marks 1004 and through hole 1002. Some embodiments can include four or more fiducial marks and other embodiments can include three or fewer fiducial marks. The fiducial marks 1004 can be used to verify hole positions and top case dimensions. In some cases, fiducial marks can be more accurate than measuring distances from merely relying on through holes 1002 since machining processes and finishing processes can hole 1002 positions. In one embodiment, an optical machine measuring device can be used to measure distances between a first group of fiducial marks on a first boss and a second group of fiducial marks on a second boss.

FIGS. 11A and 11B show structural features 1100 within rear cover 122 configured to support display 120. FIG. 11A is a cross sectional view of a support structure 1102 integrated into rear cover 122. In one embodiment, the support structure 1102 can be used to support display 120 on at least one lateral side inside rear cover 122. In another embodiment, support structure 1102 can support display 120 and films and filters 1104 that can be used with display 120. Support structure 1102 can include ridge 1106 that can form a deep undercut region 1108. In one embodiment, a portion of ridge 1106 can be shaped to remove sharply shaped features that can adversely affect display 120, particularly when display 120 and rear cover 122 undergo vibration. Area 1110 of ridge 1106 can include a shaped region shown in more detail in FIG. 11B. A curved region 1112 can be configured to join flat section 1114. In one embodiment, the curved region 1112 can join the flat section 1114 at an angle between 8 and 10 degrees as shown. Curved region 1112 and flat section 1114 together can form a blended edge. In one embodiment, the blended edge can be formed by a specially shaped profile tool, such as shown in FIG. 12. The profile tool 1202 can include cutting surfaces 1204 and 1206. In one embodiment, cutting surface 1206 can shape curved region 1112 to include an angle between 8 and 10 degrees as shown in FIG. 11B. In one embodiment, the profile tool 1202 can be used by a milling machine or a computer numerically controlled milling machine.

Figure 13:
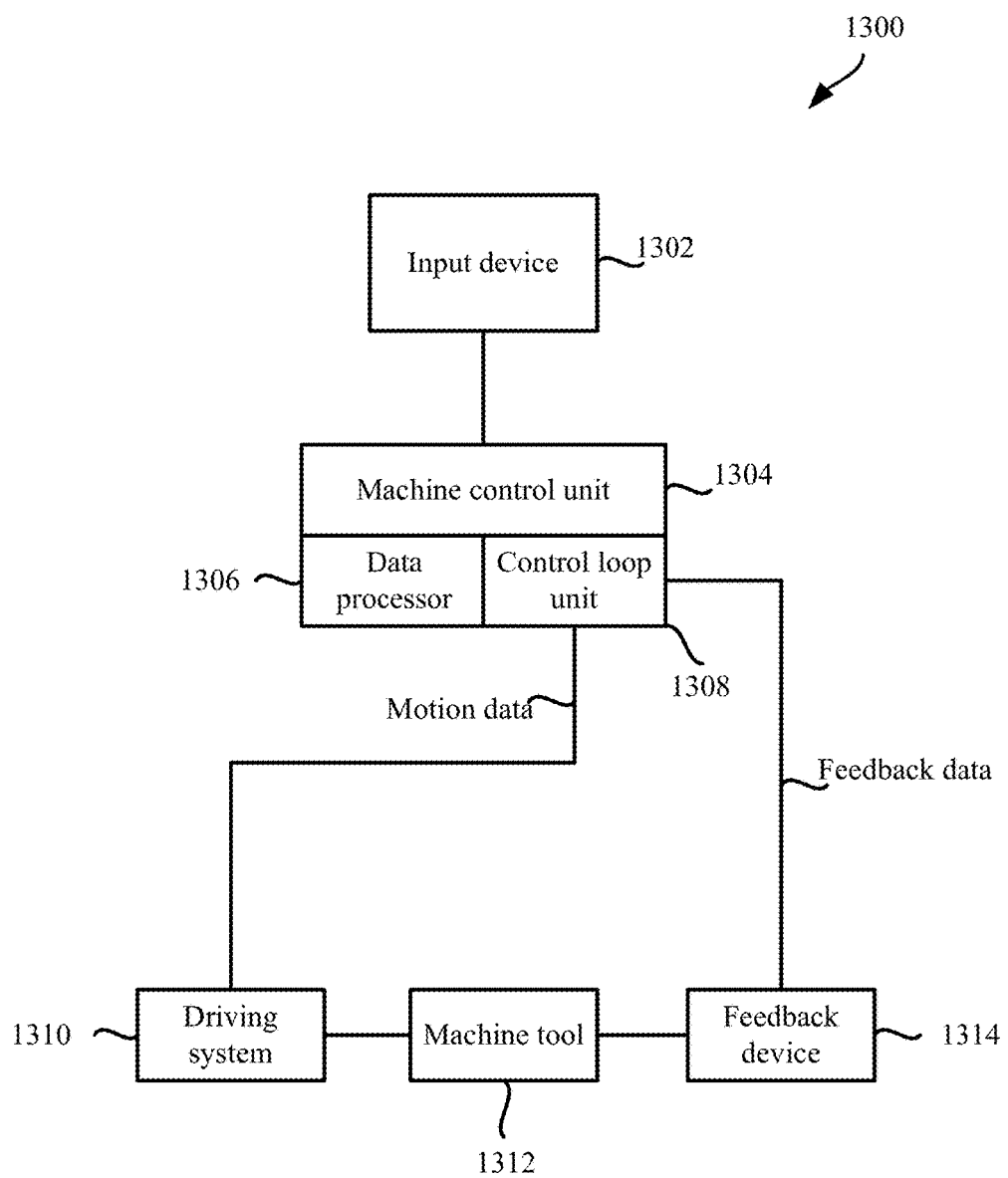
FIG. 13 is a block diagram of an arrangement of functional modules utilized by CNC system in accordance with the described embodiments.

FIG. 13 is a block diagram of an arrangement of functional modules utilized by CNC system 1300 in accordance with the described embodiments. CNC system 1300 can take the form of a closed loop system that can include feedback devices that monitor an output. In this way, any disturbance or detected variance can be quickly corrected providing a highly accurate result. In one embodiment, CNC system 1300 can use various robots or other automated equipment. In any case, CNC system 1300 can include input device 1302 that can include operating instructions related to workpiece machining, specifications, and so forth. Machine control unit 1304 can include data processor 1306 configured to provide computing resources and control loop unit 1308 configured to receive feedback data that can be used to alter an operation of driving unit 1310 using, for example, motion data. Driving unit 1310 can, in turn, control machine tool 1312 that operates to machine a work piece. Feedback device 1314 can monitor various parameters of the machining operation in order to provide feedback data to control loop unit 1308.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A laptop computer, comprising:
   a single part fastener;
   a bottom case having a bottom case opening;
   a top case including an internal boss having a boss opening that is capable of receiving the single part fastener; and
   a snap support system comprising:
      a snap plug affixed to the bottom case,
      a case snap support structure formed as an integral portion of the top case, the case snap support structure having a pocket, and
      a case snap capable of receiving the snap plug, wherein the case snap is carried by the case snap support structure within the pocket such that the case snap is capable of moving in any of three spatial dimensions in order to establish a positional relationship between the top case and the bottom case, the positional relationship comprising an alignment of the top case and the bottom case such that the boss opening is capable of receiving the single part fastener through the bottom case opening.

2. The laptop computer of claim 1, further comprising a foam strip disposed on an upper surface of the top case that defines the pocket, the foam strip being configured to minimize noise caused by friction resulting from movement between the top case and the bottom case.

3. The laptop computer of claim 1, wherein the case snap is characterized as having a length that is less than a length of the pocket such that the case snap is capable of translating within the pocket in a direction generally parallel to a plane of the top case.

4. The laptop computer of claim 2, wherein the foam strip is capable of biasing the case snap in a direction towards the bottom case.

5. The laptop computer of claim 1, wherein the case snap includes a first spring arm and a second spring arm, the first spring arm and the second spring arm capable of retaining the case snap within the pocket.

6. The laptop computer of claim 1, wherein the case snap has an external surface that is co-planar with an external surface of the top case.

7. The laptop computer of claim 1, wherein the top case defines a predetermined amount of distance that the case snap is capable of moving within the pocket in a direction generally perpendicular to a plane of the top case when the bottom case is moved relative to the top case.

8. The laptop computer of claim 1, further comprising a locating feature disposed on a rear wall of the top case.

9. An electronic device having an enclosure, the electronic device comprising:
   a fastener;
   a bottom case including a bottom case opening;
   a top case including an internal boss having a boss opening that is capable of receiving the fastener; and
   a snap support system comprising:
      a snap plug affixed to the bottom case,
      a case snap support structure formed as an integral portion of the top case, the case snap support structure having a pocket, and
      a case snap capable of receiving the snap plug, wherein the case snap is carried by the case snap support structure within the pocket such that the case snap is capable of moving in any of three spatial dimensions in order to establish a positional relationship between the top case and the bottom case, the positional relationship comprising an alignment of the top case and the bottom case such that the boss opening is capable of receiving the fastener through the bottom case opening.

10. The electronic device of claim 9, wherein the top case includes case snap retaining members capable of covering edges of the case snap such as to prevent the case snap from being removed from the pocket while the case snap is moved in a direction generally perpendicular to a plane of the top case.

11. The electronic device of claim 9, wherein the top case comprises a first fastener that retains the case snap within the pocket.

12. The electronic device of claim 11, wherein the top case further comprises a second fastener that extends through a portion of the top case.

13. The electronic device of claim 10, wherein the case snap retaining members include overhang features that cover portions of the pocket.

14. The electronic device of claim 9, wherein the snap plug is secured to the case snap at a central portion of the case snap.

15. A portable computing device, comprising:
a fastener;
a lower case including a lower case opening;
an upper case including an internal boss having a boss opening that is capable of receiving the fastener; and
a snap support system comprising:
a snap plug affixed to the lower case,
a case snap support structure formed as an integral portion of the upper case, the case snap support structure having a pocket, and
a case snap capable of receiving the snap plug, wherein the case snap is carried by the case snap support structure within the pocket such that the case snap is capable of moving in any of three spatial dimensions in order to establish a positional relationship between the upper case and the lower case, the positional relationship comprising an alignment of the upper case and the lower case such that the boss opening is capable of receiving the fastener through the lower case opening.

16. The portable computing device of claim 15, wherein the upper case further includes first and second retention structures, and the first and second retention structures include a first spring arm and a second spring arm, and the first and second spring arms are capable of retaining the case snap within the pocket while the lower case is moved relative to the upper case.

17. The portable computing device of claim 16, wherein the first and second retention structures comprise a set of first and second screws.

18. The portable computing device of claim 15, wherein the upper case includes a protrusion that extends towards a surface of the case snap and further defines a size and shape of the pocket.

19. The portable computing device of claim 18, wherein the protrusion is a foam strip that reduces an amount of noise generated by movement between the lower case and the upper case.

20. The portable computing device of claim 15, wherein a joint has a spherical contact surface such that a retention body is capable of pivoting within the case snap while the lower case is moved relative to the upper case.

* * * * *